United States Patent [19]

McConnell et al.

[11] Patent Number: 4,481,352

[45] Date of Patent: Nov. 6, 1984

[54] POLYESTER WAXES BASED ON MIXED ALIPHATIC DIBASIC ACIDS

[75] Inventors: Richard L. McConnell; Jimmy R. Trotter; Frederick B. Joyner, all of Kingsport, Tenn.

[73] Assignee: Eastman Kodak Company, Rochester, N.Y.

[21] Appl. No.: 509,533

[22] Filed: Jun. 30, 1983

[51] Int. Cl.$^3$ .............................................. C08G 63/16
[52] U.S. Cl. .................. 528/302; 260/410.6; 528/272; 560/90
[58] Field of Search .................. 528/272, 302; 560/90; 260/410.6

[56] References Cited

U.S. PATENT DOCUMENTS

| | | | |
|---|---|---|---|
| 3,249,615 | 5/1966 | Ackermann | 528/302 X |
| 4,065,439 | 12/1977 | Uno et al. | 528/302 |
| 4,152,512 | 5/1979 | Downs | 560/90 X |
| 4,156,774 | 5/1979 | Buxbaum | 528/302 X |

*Primary Examiner*—Lucille M. Phynes
*Attorney, Agent, or Firm*—Clyde L. Tootle; Daniel B. Reece III

[57] ABSTRACT

This invention relates to normally solid linear polyester waxes which contain from about 5 to about 50 mol percent of a mixture of aliphatic dibasic acids which are chemically combined in the polyester molecule. The polyester waxes may be substantially amorphous solids or low-melting solids with melting points up to about 200° C. and a heat of fusion of less than 7 cal/g. These polyester waxes are useful in preparing coating compositions for extrusion coating of paper, paperboard, or metal foils such as aluminum foil or in the lamination of these substrates.

23 Claims, No Drawings

POLYESTER WAXES BASED ON MIXED ALIPHATIC DIBASIC ACIDS

This invention relates to new linear polyester waxes which contain from about 5 to about 50 mol percent of a mixture of aliphatic dibasic acids which are chemically combined in the polyester molecule. The polyester waxes may be substantially amorphous solids or semicrystalline solids with melting points up to about 200° C. and a heat of fusion of less than 7 cal/g. These polyester waxes are useful in preparing coating compositions for extrusion coating of paper, paperboard, or metal foils such as aluminum foils or in the lamination of these substrates.

Heretofore, coatings have been widely used in the art to coat various substrates such as paper, fiberboard, foils, and the like. These coatings may provide barrier properties to the coated substrate or provide a means for package construction. Generally, the coating is provided with naturally occurring waxes such as paraffin wax, beeswax, or the like or synthetic polyolefins such as polyethylene or polyethylene waxes or ethylene/vinyl acetate copolymers and the ethylene/vinyl acetate copolymer waxes. While these waxes have been found to be extremely useful in coating applications, one deficiency of such prior used polymers is that the melting point range is quite limited. It would therefore be an advance in the state of the art to provide synthetic waxes having a wide range of melting points which allows these waxes to be used in a wide range of useful purposes.

According to the present invention, it has now been found that new and useful polyester waxes with narrow molecular weight distributions and with melting points up to about 200° C. can readily be prepared. This broad range of melting points is not available from conventional waxes. It is also possible to vary the molecular weight of these waxes and to provide waxes with different rheological characteristics. Thus, polymers with wax-like properties can be prepared which have inherent viscosities in the range from about 0.05 to about 0.39. Inherent viscosities are determined at 25° C. in a 60/40 weight percent mixture of phenol/tetrachloroethane at a concentration of 0.5 g./100 ml. These new waxes are useful in the coating of paper, paperboard, or metal foils such as aluminum foils or in the lamination of these substrates.

These new polyester waxes may be amorphous solids or they may contain crystallizable moieties with crystalline melting points ranging up to about 200° C. and have heat of fusion of less than 7 cal/g. They contain from about 5 to about 50 mol percent of a mixture of aliphatic dibasic acids containing 4 to 12 carbon atoms which are chemically combined in the polyester molecule. Mixtures of aliphatic dibasic acids which are operable in this invention include mixtures of succinic, glutaric, and adipic acids as well as mixtures of adipic and glutaric acids. In addition to the dibasic acid mixtures, esters of these dibasic acids derived from methyl, ethyl, propyl, butyl, isobutyl, and the like alcohols may be used in the synthesis of the polyester waxes of this invention. By using substantial quantities of these dibasic acid moieties in the polyester waxes, it is possible to provide linear, thermoplastic substantially amorphous polyester waxes or polyester waxes with a low order of crystallinity which have excellent adhesion to paper and foils and which provide hard, glossy surfaces on these substrates.

The polyesters of this invention may also contain suitable amounts of aromatic or cycloaliphatic acids and one or more selected aliphatic or cycloaliphatic glycols. Such suitable dibasic acids include terephthalic, isophthalic, cis or trans 1,4-cyclohexanedicarboxylic and cis or trans 1,3-cyclohexanedicarboxylic and the like.

Glycols useful in preparing the polyester waxes of this invention include ethylene glycol, 1,3-propanediol, propylene glycol, 1,4-butanediol, 1,5-pentanediol, 1,6-hexanediol, 1,8-octanediol, 1,4-cyclohexanedimethanol, 1,3-cyclohexanedimethanol, 2,2-dimethyl-1,3-propanediol, 2,2,4,4-tetramethyl-1,3-cyclobutanediol, diethylene glycol, poly(oxyethylene)glycol, and the like.

These new copolyester waxes are readily prepared using typical polycondensation reaction conditions. They may be prepared either by melt phase batch or continuous processes based on esterification or transesterification reactions well known to the art.

Typical polyesterification catalysts which may be used include titanium alkoxides, dibutyltin dilaurate, and combinations of zinc, manganese, or magnesium acetates or benzoates with antimony oxides or antimony triacetate.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

About 81.48 grams (0.42 moles) of dimethyl terephthalate, 44.66 grams of mixed aliphatic dibasic esters comprising 20.7 weight percent dimethyl succinate, 19.2 weight percent dimethyl adipate, and 58.1 weight percent dimethyl glutarate, 70.5 grams (1.137 moles) of ethylene glycol, 31.8 grams (0.30 moles) of diethylene glycol, and 100 ppm of titanium catalyst (titanium isopropoxide in n-butanol) are placed into a 500-mL single-neck, round-bottom flask equipped with a nitrogen inlet, a stirrer, a vacuum outlet, and a condensing flask. The flask is heated at 200° C. in a metal bath for one hour with a nitrogen sweep over the reaction mixture. Then the temperature of the metal bath is increased to 210° C. for one hour. When the theoretical amount of methanol has distilled from the reaction mixture, the metal bath temperature is increased to 250° C. and the pressure in the flask is reduced to about 0.1 mm of mercury. The flask is heated at 250° C. at reduced pressure for 38 minutes. The flask is then removed from the bath and is allowed to cool under a nitrogen atmosphere as the polymer solidifies. The polymer is analyzed by an NMR method. It was characterized to be a poly(ethylene terephthalate) copolyester containing 37 mol percent mixed aliphatic dibasic acid and 28 mol percent diethylene glycol. The polymer is an opaque, white color and has an I.V. of 0.33 and a molecular weight $(M_n)$ of 5878.

The polymer has a Thermosel melt viscosity of 1500 cp at 215° C. By DSC analysis, the polymer has a glass transition temperature (Tg) of 11° C. and a melting point (Tm) of 123° C. [heat of fusion ($\Delta H_f$) is 1.1 cal/g].

The above polymer is readily melt coated 2–2.5 mils thick onto 60 pound kraft paper. Using a Sentinel heat sealer at 325° F. and 28 psi for 0.2 seconds, the coated paper is readily heat sealed to uncoated kraft paper and aluminum foil. Initial T-peel strengths are 1.7 pounds/inch-width (with fiber tear) for paper paper bonds and 4.0 pounds/inch-width for paper/aluminum foil bonds.

EXAMPLE 2

The procedure of Example 1 is repeated except that 101.85 grams (0.525 moles) of dimethyl terephthalate and 27.91 grams of mixed aliphatic dibasic esters are used to prepare the copolyester. Analysis of the polymer indicates that it is a poly(ethylene terephthalate) copolyester containing 19 mol percent mixed aliphatic dibasic acids and 27 mol percent diethylene glycol. The polymer is an opaque, white color and has an I.V. of 0.27 and a molecular weight ($M_n$) of 3826.

The polymer has a Thermosel melt viscosity of 1250 cp at 215° C. By DSC analysis, the polymer has a glass transition temperature (Tg) of 28° C. and melting points (Tm) of 84 and 162° C. [total heat of fusion ($\Delta H_f$) is <1 cal/g].

The above polymer is readily melt coated 2-2.5 mils thick onto 50-pound kraft paper. Using a Sentinel heat sealer at 325° F. and 28 psi for 0.2 seconds, the coated paper is readily heat sealed to uncoated kraft paper and aluminum foil. Initial T-peel strengths are 2.7 pounds/inch-width (with fiber tear) for paper/paper bonds and 1.9 pounds/inch-width for paper/aluminum foil bonds.

EXAMPLE 3

The procedure of Example 1 is repeated except that 101.85 grams (0.525 moles) of dimethyl terephthalate, 27.91 grams of mixed aliphatic dibasic esters, 78.12 grams (1.26 moles) of ethylene glycol, and 14.84 grams (0.14 moles) of diethylene glycol are used to prepare the copolyester. Analysis of the polymer indicates that it is a poly(ethylene terephthalate) copolyester containing 20 mole percent mixed aliphatic dibasic acids and 15 mole percent diethylene glycol. The polymer is an opaque, white color and has an I.V. of 0.25 and a molecular weight ($M_n$) of 3383.

The polymer has a Thermosel melt viscosity of 1125 cp at 215° C. By DSC analysis, the polymer has a glass transition temperature (Tg) of 31° C. and a melting point (Tm) of 182° C. [heat of fusion ($\Delta H_f$) is 6.5 cal/g].

The above polymer is readily melt coated 2-2.5 mils thick onto 60-pound kraft paper. Using a Sentinel heat sealer at 325° F. and 28 psi for 0.2 seconds, the coated paper is readily heat sealed to uncoated kraft paper and aluminum foil. Initial T-peel strengths are 2.4 pounds/inch-width (with fiber tear) for paper/paper bonds and 0.7 pound/inch-width for paper/aluminum foil bonds.

EXAMPLE 4

The procedure of Example 1 is repeated except that 122.22 grams (0.63 moles) of dimethyl terephthalate, 11.17 grams of mixed aliphatic dibasic esters, 70.5 grams (1.137 moles) of ethylene glycol, and 31.8 grams (0.30 moles) of diethylene glycol are used to prepare the copolyester. Analysis of the polymer indicates that it is a poly(ethylene terephthalate)copolyester containing 8 mol percent mixed aliphatic dibasic acids and 24 mol percent diethylene glycol. The polymer is an opaque, white color and has an I.V. of 0.18 and a molecular weight ($M_n$) of 3946.

The polymer has a Thermosel melt viscosity of 425 cp at 215° C. By DSC analysis, the polymer has a glass transition temperature (Tg) of 35° C. and a melting point (Tm) of 180° C. [heat of fusion ($\Delta H_f$) is 5.8 cal/g].

The above polymer is readily melt coated 2-2.5 mils thick onto 60-pound kraft paper. Using a Sentinel heat sealer at 275° F. and 28 psi for 0.2 seconds, the coated paper is readily heat sealed to uncoated kraft paper and aluminum foil. Initial T-peel strengths are 1.6 pounds/inch-width (with fiber tear) for paper/paper bonds and 0.3 pound/inch-width for paper/aluminum foil bonds.

EXAMPLE 5

The procedure of Example 1 is repeated except that 78.12 grams (1.26 moles) of ethylene glycol and 14.84 grams (1.26 moles) of diethylene glycol are used to prepare the copolyester. Analysis of the polymer indicates that it is a poly(ethylene terephthalate) copolyester containing 32 mol percent mixed aliphatic dibasic acids and 10 mol percent diethylene glycol. The polymer is an opaque, white color and has an I.V. of 0.28 and a molecular weight ($M_n$) of 3829.

The polymer has a Thermosel melt viscosity of 1000 cp at 215° C. By DSC analysis, the polymer has a glass transition temperature (Tg) of 16° C. and melting points (Tm) of 84 and 152° C. [total heat of fusion ($\Delta H_f$) is ~1 cal/g].

The above polymer is readily melt coated 2-2.5 mils thick onto 60-pound kraft paper. Using a Sentinel heat sealer at 275° F. and 28 psi for 0.2 seconds, the coated paper is readily heat sealed to uncoated kraft paper and aluminum foil. Initial T-peel strengths are 0.9 pounds/inch-width for paper/paper bonds and 0.6 pound/inch-width for paper/aluminum foil bonds.

EXAMPLE 6

About 80 grams of mixed aliphatic dibasic esters comprising 20.7 weight percent dimethyl succinate, 19.2 weight percent dimethyl adipate and 58.1 weight percent dimethyl glutarate, 62 grams (1.0 mole) of ethylene glycol and 100 ppm of titanium catalyst (titanium isopropoxide in n-butanol) are placed into a 500 ml. single-neck, round-bottom flask equipped with a stirrer, a vacuum outlet, and a condensing flask. The flask is heated at 200° C. in a metal bath for one hour with a nitrogen sweep over the reaction mixture. Then the temperature of the metal bath is increased to 210° C. for one hour. When the theoretical amount of methanol has distilled from the reaction mixture, the metal bath temperature is increased to 250° C. and the pressure in the flask is reduced to about 0.1 mm of mercury. The flask is heated at 250° C. at reduced pressure for 38 minutes. The flask is then removed from the bath and is allowed to cool under a nitrogen atmosphere as the polymer cools. The polymer is a liquid at 23° C. and has a Thermosel melt viscosity of 838 at 190° C. The polymer is not suitable for use in a melt coating application.

The waxes of this invention provide coating compositions for coating substrates such as Kraft paper, milk carton stock, photographic papers, cellulosic sheets, primed metal foils such as aluminum and the like. The coated substrates find utility in food packaging, medicine packing or other well known uses.

The invention has been described in detail with particular reference to preferred embodiments thereof, but it will be understood that variations and modifications can be effected within the spirit and scope of the invention.

We claim:

1. A normally solid linear copolyester wax composition having a melting point less than 200° C., heat of fusion of less than 7 cal/g, an inherent viscosity from about 0.05 to about 0.4 and a melt viscosity of about 150 cp. to about 2000 cp. at 215° C. containing about 95 to about 50 mole percent of at least one aromatic dicarboxylic acid member selected from the group consisting of aromatic dicarboxylic acids and the acid functioning derivatives thereof, about 5 to about 50 mole percent of a mixture of aliphatic dicarboxylic acid members containing from 4 to 12 carbon atoms and the acid functioning derivatives thereof, about 95 to about 60 mole percent of ethylene glycol and about 5 to about 40 mole percent of diethylene glycol.

2. A normally solid linear copolyester wax composition according to claim 1 wherein said aromatic dicarboxylic acid member is dimethyl terephthalate.

3. A normally solid linear copolyester wax composition according to claim 2 wherein said mixture of aliphatic dicarboxylic acid members contains about 21 weight percent dimethyl succinate, about 19 weight percent dimethyl adipate and about 58 weight percent dimethyl glutarate.

4. A normally solid linear copolyester wax composition according to claim 3 wherein the melting point is about 80° C. to about 185° C.

5. A normally solid linear copolyester wax composition according to claim 4 wherein said inherent viscosity is about 0.15 to about 0.35.

6. A normally solid linear copolyester wax composition according to claim 5 wherein said melt viscosity is about 400 cp. to about 1600 cp. at 215° C.

7. A normally solid linear copolyester wax composition having a melting point less than 200° C., a heat of fusion of less than 7 cal/g, an inherent viscosity from about 0.05 to about 0.4 and a melt viscosity of about 150 cp. to about 2000 cp. at 215° C. containing about 95 to about 60 mole percent of at least one aromatic dicarboxylic acid member selected from the group consisting of aromatic dicarboxylic acids and the acid functioning derivatives thereof, about 5 to about 40 mole percent of a mixture of aliphatic dicarboxylic acid members selected from the group consisting of succinic, adipic and glutaric acids and the acid functioning derivatives thereof, about 85 to about 70 mole percent of ethylene glycol and about 15 to about 30 mole percent of diethylene glycol.

8. A normally solid linear copolyester wax composition according to claim 7 wherein said aromatic dicarboxylic acid member is dimethyl terephthalate.

9. A normally solid linear copolyester wax composition according to claim 8 wherein said mixture of aliphatic dicarboxylic acid members contains about 21 weight percent dimethyl succinate, about 19 weight percent dimethyl adipate and about 58 weight percent dimethyl glutarate.

10. A normally solid linear copolyester wax composition according to claim 9 wherein the melting point is about 80° C. to about 185° C.

11. A normally solid linear copolyester wax composition according to claim 10 wherein said inherent viscosity is about 0.15 to about 0.35.

12. A normally solid linear copolyester wax composition according to claim 11 wherein said melt viscosity is about 400 cp. to about 1600 cp. at 215° C.

13. A normally solid linear copolyester wax composition having a melting point less than 200° C., a heat of fusion of less than 7 cal/g, an inherent viscosity from about 0.1 to about 0.4 and a melt viscosity of about 150 cp. to about 2000 cp. at 215° C. containing about 95 to about 60 mole percent of at least one aromatic dicarboxylic acid member selected from the group consisting of aromatic dicarboxylic acids and the acid functioning derivatives thereof, about 5 to about 40 mole percent of a mixture of aliphatic dicarboxylic acid members selected from the group consisting of succinic, adipic and glutaric acids and the acid functioning derivatives thereof, about 85 to about 70 mole percent of ethylene glycol and about 15 to about 30 mole percent of diethylene glycol.

14. A normally solid linear copolyester wax composition according to claim 13 wherein said aromatic dicarboxylic acid member is dimethyl terephthalate.

15. A normally solid linear copolyester wax composition according to claim 14 wherein said mixture of aliphatic dicarboxylic acid members contains about 21 weight percent dimethyl succinate, about 19 weight percent dimethyl adipate and about 58 weight percent dimethyl glutarate.

16. A normally solid linear copolyester wax composition according to claim 15 wherein the melting point is about 80° C. to about 185° C.

17. A normally solid linear copolyester wax composition according to claim 16 wherein said inherent viscosity is about 0.15 to about 0.35.

18. A normally solid linear copolyester wax composition according to claim 17 wherein said melt viscosity is about 400 cp. to about 1600 cp. at 215° C.

19. A normally solid linear copolyester wax composition having a melting point less than 185° C., a heat of fusion of less than 7 cal/g, an inherent viscosity from about 0.25 to about 0.33 and a melt viscosity of about 1000 cp. to about 1600 cp. at 215° C. containing about 85 to about 60 mole percent of terephthalic acid, about 15 to about 40 mole percent of a mixture of succinic, adipic and glutaric acids, about 85 to about 70 mole percent of ethylene glycol and about 15 to about 30 mole percent of diethylene glycol.

20. A normally solid linear copolyester wax composition having a melting point less than 185° C., a heat of fusion of less than 7 cal/g, an inherent viscosity from about 0.25 to about 0.35 and a melt viscosity of about 1100 cp. to about 1600 cp. at 215° C. containing about 80 to about 65 mole percent of terephthalic acid, about 15 to about 40 mole percent of a mixture of succinic, adipic and glutaric acids, about 85 to about 70 mole percent of ethylene glycol and about 15 to about 30 mole percent of diethylene glycol.

21. A normally solid linear copolyester wax composition according to claim 20 having a melting point of about 123° C., a heat of fusion of less than 7 cal/g, an inherent viscosity of about 0.33, and a melt viscosity of about 1550 cp. at 215° C. containing about 63 mole percent of terephthalic acid, about 37 mole percent of a mixture of succinic, adipic and glutaric acids, about 72 mole percent of ethylene glycol and about 28 mole percent of diethylene glycol.

22. A normally solid linear copolyester wax composition according to claim 20 having a melting point of about 84° C. to 162° C., a heat of fusion of less than 7 cal/g, an inherent viscosity of about 0.27, and a melt viscosity of about 1250 cp. at 215° C. containing about 81 mole percent of terephthalic acid, about 19 mole percent of a mixture of succinic, adipic and glutaric acids, about 73 mole percent of ethylene glycol and about 27 mole percent of diethylene glycol.

23. A normally solid linear copolyester wax composition according to claim 20 having a melting point of about 182° C., a heat of fusion of less than 7 cal/g, an inherent viscosity of about 0.25, and a melt viscosity of about 1125 cp. at 215° C. containing about 80 mole percent of terephthalic acid, about 20 mole percent of a mixture of succinic, adipic and glutaric acids, about 85 mole percent of ethylene glycol and about 15 mole percent of diethylene glycol.

* * * * *